Figure 1:
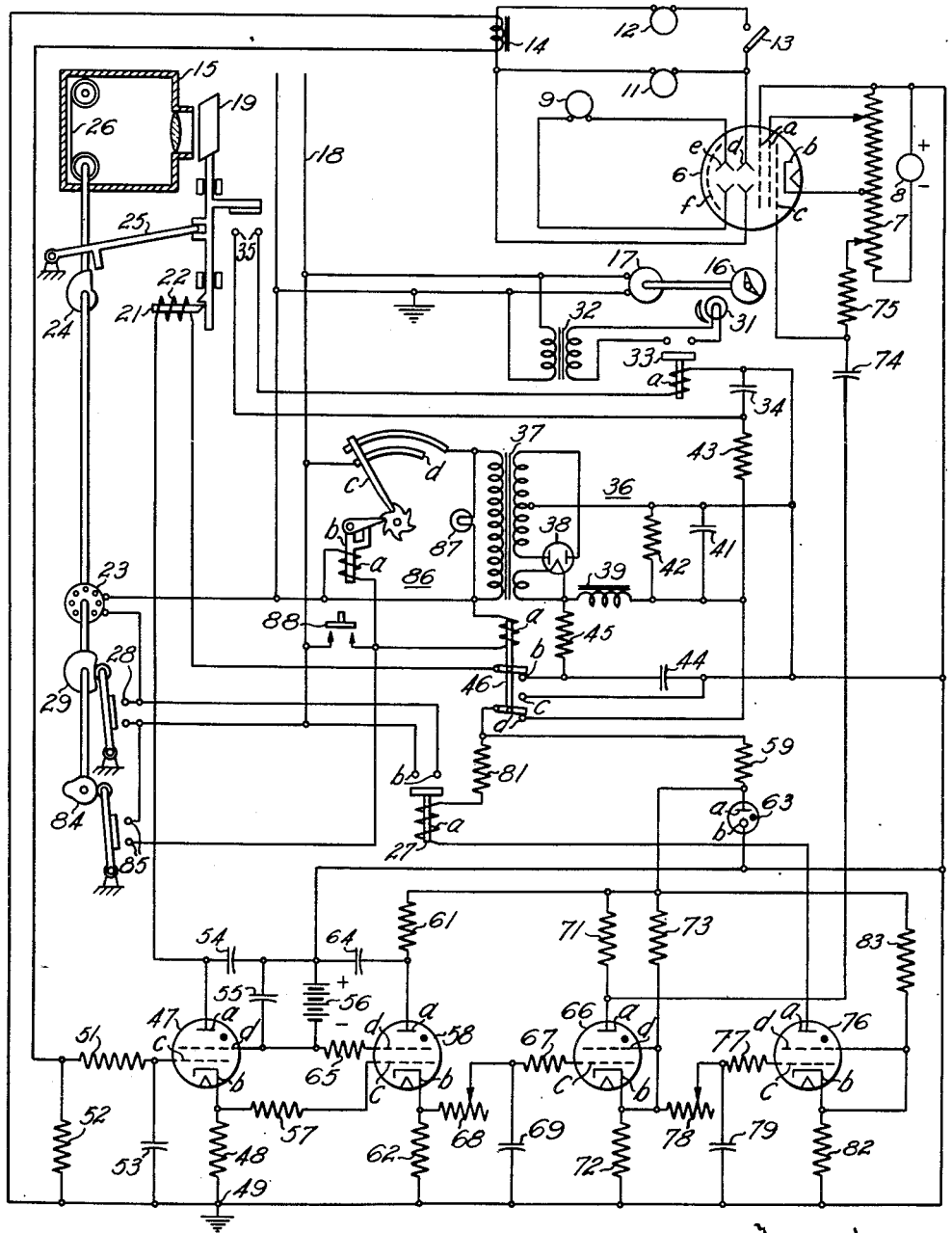

Patented Aug. 2, 1949

2,477,847

UNITED STATES PATENT OFFICE 2,477,847

APPARATUS FOR RESETTING CATHODE-RAY OSCILLOGRAPHS

Abe M. Zarem, Pasadena, Calif., and Raymond D. Weinhold, Milwaukee, Wis., assignors to Allis-Chalmers Manufacturing Company, Milwaukee, Wis., a corporation of Delaware Application January 10, 1946, Serial No. 640,333

6 Claims. (Cl. 346—107)

1

This invention relates in general to electric control systems and more particularly to means for automatically controlling a plurality of successive operations of a camera forming part of an oscillographic system of the cathode ray type.

In the study of random transient conditions of electric circuits it is possible to obtain a record of a disturbance in an operating condition by means of a cathode ray oscilloscope in which the trace of the beam on a screen has a substantial time of persistence, the persistent trace being photographed under the control of an abnormal condition affecting the condition being observed or in response to the latter condition. If records of successive occurrences of a disturbance are thus to be obtained at infrequent intervals, it becomes advantageous to provide the oscillograph with suitable control elements for enabling it to operate unattended to produce records of all such disturbances occurring between periodic inspections as well as records of their time of occurrence. The desired result may be obtained by pointing the camera toward the oscilloscope and a time indicating device disposed adjacent thereto, and by providing automatic means responsive to the occurrence of a transient condition to cause opening of the camera shutter, momentary suppression of the cathode ray beam of the oscilloscope, momentary illumination of the time indicating device, reclosure of the shutter, winding of the exposed film and resetting of the entire system. Additional means are preferably provided for locking out the system when the entire film has been exposed.

In a preferred embodiment of the invention the shutter is caused to open by means of a thyratron connecting a charged capacitor with a trip coil for releasing the shutter, and the remaining control operations are effected in response to discharge of the capacitor by means of thyratrons connected with the capacitor discharging thyratron through time delay circuits.

It is therefore an object of the present invention to provide a control system for a cathode ray oscillograph for producing a combined record of a transient condition of an electric circuit and of the time of occurrence of such condition.

Another object of the present invention is to provide a control system for a cathode ray oscillograph for automatically producing separate records of a plurality of occurrences of a transient condition of an electric circuit.

It is another object of the present invention to provide a control system for a cathode ray oscillograph which is automatically rendered inoperative when the supply of film of the camera is exhausted.

2

Objects and advantages other than those above set forth will be apparent from the following description when read in connection with the accompanying drawing which diagrammatically represents one embodiment of the present invention shown connected for recording the voltage of an electric circuit in response to the flow of current above a predetermined value therethrough.

Referring more particularly to the drawing by characters of reference, numeral 6 generally designates a cathode ray oscilloscope of any suitable known type, which is represented conventionally on the drawing. Oscilloscope 6 comprises anodes 6a, a cathode 6b, a control grid 6c, two pairs of deflection plates 6d, 6e and a screen 6f. The necessary potentials for energizing anodes 6a and grid 6c may be obtained from any suitable source such as a voltage divider 7 energized from a direct current generator 8 having its positive terminal connected to ground. The cathode ray beam may be caused continually to sweep across screen 6f by impression on deflection plates 6e, for example, of a periodic potential from a suitable source conventionally represented as a generator 9. The other pair of deflection plates is impressed with potential representing any desired operating condition to be observed and which cooperates with the sweep potential to cause the cathode ray to produce a continual succession of luminous traces on screen 6f. The screen is chosen of such material that each trace produced thereon by the cathode ray has a substantial time of persistence, so that any trace may still be photographed within an appreciable length of time after it has been produced. Tube 6 may be assumed, for example, to be used for recording variations in the voltage of an alternating current generator 11 in response to abnormal flow of current between the generator and a load device 12 through a switch 13 and a current transformer 14.

Photographic copies of selected traces may be obtained by means of a camera 15 pointed toward screen 6f and properly focused thereon. It will be understood that simultaneous records of a plurality of related operating conditions may be obtained by disposing within the field of camera 15 a plurality of oscilloscopes which are similar to tube 6 and similarly controlled in response to a common abnormal condition. To obtain on each photograph a record of the time of occurrence of the condition in response to which the camera is controlled, a suitable time indicating device may be disposed within the field of camera 15 adjacent tube 6. The time indicating device is represented on the drawing as an electric clock 16 comprising the usual reluctance type motor 17 energized from an alternating current supply circuit 18.

Camera 15 is provided with a shutter 19 of any suitable type such as the gravity operated type shown on the drawing. Shutter 19 is held in the closed position by a latch 21 which may be withdrawn by means of a trip coil 22. The shutter may be reclosed by means of an electric motor 23 through a mechanism comprising a cam 24 and a lever 25. Motor 23 also serves to drive the mechanism for winding the exposed portion of a roll of film 26 on a spool and thereby expose a fresh film portion to the lens. It will be understood, however, that the film winding mechanism may be suitably modified if the records are to be obtained on individual pieces of film or on plates.

Motor 23 may be momentarily energized from circuit 18 through contacts 27b of a relay 27 to start the motor rotating. The motor thereafter remains energized through holding contacts 28 controlled by a cam 29 to cause cam 24 to effect a complete revolution. Camera 15, tube 6 and clock 16 are preferably disposed within a light tight enclosure (not shown) and clock 16 is momentarily illuminated by means of a small electric lamp 31 during the opening of shutter 19. Lamp 31 may be supplied with current from circuit 18 through a transformer 32 and through the contacts of a relay 33. Operation of relay 33 may be coordinated in any suitable manner with the operation of shutter 19 as by connecting relay coil 33a with a charged capacitor 34 through contacts 35 which are closed by the shutter.

Unidirectional current for charging capacitor 34 and for energizing the control elements of the system may be obtained from circuit 18 through a rectifying system generally designated 36. The rectifying system may be of any suitable known type and may comprise a transformer 37 and a rectifying tube 38 associated with filtering means comprising a series reactor 39 and a shunt capacitor 41. A loading resistor 42 prevents excessive rise of the rectifier voltage between operations of the system. Charging current for capacitor 34 is obtained from rectifier 36 through a resistor 43. As a relatively large current is required in trip coil 22 to operate latch 21, current for the trip coil is preferably obtained from a capacitor 44 which may be gradually charged from rectifier 36 through a resistor 45. Capacitor 44 may be discharged abruptly through contacts 46b of a resetting relay 46, trip coil 22, a shield-grid thyratron 47 and a resistor 48 to actuate latch 21. The plate circuit of thyratron 47 and the associated circuits are preferably grounded to the frame on which the elements of the system are mounted, as indicated at 49.

The operation of thyratron 47 may be controlled in any suitable manner in dependence upon an abnormal condition affecting the operation of generator 11 or of any other circuit under observation. For example, control grid 47c of the thyratron may be connected through a current limiting resistor 51 with a grounded resistor 52 supplied with current from current transformer 14. A capacitor 53 is preferably connected between grid 47c and ground to divert accidental surge potentials which might cause undesired operation of thyratron 47. Anode 47a and shield-grid 47d are preferably likewise connected to ground through capacitors 54, 55, respectively. Shield-grid 47d is maintained at a predetermined potential with respect to ground by means of a battery 56 to impart to grid 47c the desired characteristic.

Cathode 47b is connected through a current limiting resistor 57 with the control grid 58c of a second thyratron 58 to cause thyratron 58 to become continuously conductive in response to the discharge of capacitor 44 through thyratron 47. Thyratron 58 completes a circuit from the positive terminal of rectifier 36 to ground through contacts 46d, a current limiting resistor 59, a plate resistor 61 and a cathode resistor 62. The plate potential of thyratron 58 is maintained at a substantially constant value by means of a regulating glow tube 63. Anode 58a is connected to ground through a surge diverting capacitor 64, and shield-grid 58d is connected with battery 56 through a current limiting resistor 65.

The control grid 66c of a third thyratron 66 is connected with resistor 62 through a current limiting resistor 67 and through an adjustable time delay circuit comprising a variable resistor 68 and a capacitor 69 to cause thyratron 66 to become conductive an adjustable time after thyratron 58 becomes conductive. The plate circuit of thyratron 66 is connected between anode 63a and ground through a plate resistor 71 and a cathode resistor 72. Cathode 66b and shield-grid 66d may be jointly connected with anode 63a through a resistor 73.

The potential variations of anode 66a are utilized in any suitable known manner for controlling the potential of grid 6c to cause momentary suppression of the cathode ray beam a predetermined time interval after thyratron 47 is rendered conductive. For example, grid 6c may be connected with anode 66a through a capacitor 74 and with grid voltage divider 7 through a resistor 75 to cause impression of a negative transient voltage on grid 6c when thyratron 66 becomes conductive.

The control grid 76c of a fourth thyratron 76 is connected with resistor 72 through a current limiting resistor 77 and through a second adjustable time delay circuit comprising a variable resistor 78 and a capacitor 79. The plate circuit of thyratron 76 is connected between the positive terminal of rectifier 36 and ground through contacts 46d, a current limiting resistor 81, coil 27a and a cathode resistor 82 to cause operation of relay 27 a predetermined time interval after thyratron 47 becomes conductive. Shield-grid 76d and cathode 76b may be jointly connected with anode 63a through a resistor 83.

To render the system inoperative and provide a signal when the supply of film of camera 15 is exhausted, transformer 37 is disconnected from circuit 18 after a predetermined adjustable number of operations of motor 23. For the latter purpose, motor 23 drives a cam 84 controlling contacts 85 for connecting circuit 18 with the coil 86a of a step relay 86 controlling the connection of transformer 37 with circuit 18. A lamp 87 may also be controlled by relay 86 to indicate whether or not the system is in operating condition.

Coil 46a is connected in parallel with coil 86a to cause resetting of the system after each operation of motor 23. A push-button switch 88 connected in parallel with contacts 85 may conveniently be utilized for resetting the system manually during trial operation thereof.

A considerable latitude is allowable in the choice of the electrical characteristics of the elements of herein described systems. The following engineering data relate to the essential elements of a system which has been found to operate satisfactorily and are given only by way of example:

| | |
|---|---|
| Cathode ray tube 6 | Type 5BP1 |
| Rectifier 38 | Type 5Y3 |
| Glow tube 63 | Type VR150 |
| Thyratrons 47, 58, 66, 76 | Type 2050 |
| Resistor 81 ohms | 1000 |
| Resistor 59 do | 2900 |
| Resistor 82 kilo-ohms | 4 |
| Resistor 83 do | 6 |
| Resistor 65 do | 10 |
| Resistors 62, 72 do | 15 |
| Resistor 52 do | 25 |
| Resistor 71 do | 31.5 |
| Resistor 61 do | 45 |
| Resistors 42, 45, 51, 48, 67, 77, 57 do | 50 |
| Resistor 73 do | 70 |
| Resistors 43, 75 do | 100 |
| Resistor 68 do | 500 |
| Resistor 78 do | 600 |
| Voltage divider 7 megohms | 2.5 |
| Capacitor 54 microfarad | 0.0005 |
| Capacitors 53, 64 do | 0.001 |
| Capacitor 69 do | 0.1 |
| Capacitors 55, 79 do | 0.5 |
| Capacitor 34 do | 10 |
| Capacitors 41, 44 do | 20 |
| Capacitor 74 do | 0.5 |
| Generator 8 volts | 1500 |
| Battery 56 do | 7½ |
| Rectifier 36 do | 300 |
| Reactor 39 henries | 20 |

Before the system is placed in operation, camera 15 is loaded with film and relay 86 is set in the position shown in the drawing. Circuit 18 is energized and clock 16 is set to show standard time or any other convenient time indication. Resistor 75 is connected with a suitable point of voltage divider 7 to cause impression on grid 6c of a potential having the value required for focusing the cathode ray beam of tube 6 on screen 6f as is well known. The cathode ray beam is caused to sweep across screen 6f by the voltage impressed between plates 6e and the voltage impressed between deflection plates 6d causes the beam to produce on screen 6f a succession of traces having a substantial time of persistence. Rectifier 36 supplies unidirectional potential for maintaining capacitors 34, 44 in charged condition and also supplies plate potential for the different thyratrons.

As long as the voltage of grid 47c remains below a critical value depending on the voltage of battery 56, thyratron 47 remains nonconductive. Thyratron 58 likewise remains nonconductive, grid 58c then being at cathode potential and therefore unable to overcome the action of battery 56 through shield-grid 58d. Cathode 66b is brought above the potential of grid 66c by the flow of current from rectifier 36 through contacts 46d and resistors 59, 73, 72, and cathode 76b is likewise brought above the potential of grid 76c by the flow of current through resistors 83 and 82, with the result that thyratrons 66, 76 also remain nonconductive.

The connections between thyratron 47 and generator 11 are so effected that upon occurrence of a predetermined abnormal condition in the circuit of generator 11 and load 12 grid 47c reaches a sufficient potential to render thyratron 47 conductive. Capacitor 44 thereupon abruptly discharges through contacts 46b, trip coil 22, thyratron 47 and resistor 48. Trip coil 22 withdraws latch 21, thereby allowing shutter 19 to drop and expose film 26 to the traces appearing on screen 6f. The speed of operation of shutter 19 is preferably so related to the time of persistence of the traces that when the shutter opens the particular traces affected by the abnormal condition which caused opening of the shutter are still of sufficient intensity to produce a record on film 26.

When shutter 19 reaches the open position, contacts 35 are closed to discharge capacitor 34 through relay coil 33a. Relay 33 is thereby caused momentarily to close its contacts to connect lamp 31 with transformer 32. Lamp 31 momentarily illuminates clock 16, thereby causing a record of the time of operation of relay 33 to appear on film 26. The time indicated by clock 16 may be taken as the time of occurrence of the abnormal condition, but the time taken by the operation of shutter 19 and of relay 33 may be subtracted therefrom if greater accuracy is desired.

Discharge of capacitor 44 through thyratron 47 and resistor 48 causes grid 58c to reach a potential which is sufficient to render thyratron 58 conductive. As the plate potential of thyratron 58 is supplied from rectifier 36, thyratron 58 remains conductive after thyratron 47 ceases to carry current of appreciable intensity. The continuous flow of current through thyratron 58 and resistor 62 causes the potential of grid 66c to rise gradually at a rate depending on the time constant of the combination of resistor 68 with capacitor 69. After a predetermined time delay, the grid potential becomes sufficiently higher to cause thyratron 66 to become conductive.

The flow of current from rectifier 36 through thyratron 66 is established abruptly, thereby abruptly lowering the potential of anode 66a to a predetermined value. The potential drop of anode 66a is transmitted to grid 6c through capacitor 74. The cathode ray beam is thus suppressed, and remains suppressed until grid 6c again rises beyond a predetermined potential by the gradual partial discharge of capacitor 74. The discharge current of capacitor 74 flows through thyratron 66, resistor 72, voltage divider 7 and resistor 75, and ceases when grid 6c has again the same potential as the tap of voltage divider 7 connected with resistor 75.

Resistor 68 is so adjusted that the cathode ray beam is suppressed when the desired number of traces have been produced on screen 6f following the occurrence of the abnormal conditions to which the system is responsive. The number of traces photographed simultaneously by camera 15 is thus limited so as to prevent the record so obtained from becoming confused.

The flow of current through thyratron 66 and resistor 72 likewise causes thyratron 76 to become conductive a predetermined time after thyratron 66 depending on the adjustment of resistor 78. Shutter 19 is thus caused to reclose after film 26 has been exposed to the persistent traces for a sufficient length of time but before the cathode ray beam is released by restoration of the normal potential on grid 6c.

Thyratron 76 receives current from rectifier 36 through resistor 81 and coil 27a to cause relay 27 to close contacts 27b. Current is thus supplied to motor 23 from circuit 18. Motor 23 actuates cam 29, which closes contacts 28 to maintain motor 23 energized independently of relay 27. Cam 24 raises shutter 19 through lever 25, and the shutter is again held closed by latch 21 as coil 22 is then substantially without current. Motor 23 also causes winding of the exposed portion of film 26 to expose a fresh film portion to the lens. Return of shutter 19 to the closed position opens contacts 35, thereby enabling rectifier 36 gradually to recharge capacitor 34 in anticipation of another operation of the system.

During rotation of motor 23, cam 84 momentarily closes contacts 85. Current is thereby momentarily supplied to coil 86a to cause the armature 86b thereto to rise and fall and thereby progress contact 86c by one step. At the same time relay 46 is momentarily actuated to momentarily disconnect the thyratrons from rectifier 36. Contact 46c also momentarily grounds the circuits of thyratrons 58, 66, 76 to remove all charges from the capacitive elements thereof. The thyratrons return to the nonconductive condition and remain in such condition when relay 46 returns to the position shown. Relay 27 is deenergized and returns to the position shown. Capacitor 44 is gradually recharged from rectifier 36 in anticipation of another operation of the system. When cam 24 has completed its revolution, contacts 28 open to cause motor 23 to stop in the position shown. The system is then reset for another operation thereof responsive to another occurrence of an abnormal operating condition of the circuit of generator 11 and load 12.

Each operation of the system causes contact 86c to progress by one step. When the system is placed in operation, contact 86c is so adjusted that the number of operations of the system which result in complete exposure of film 26, also results in contact 86c being moved out of engagement with contact 86d. A connection between transformer 37 and circuit 18 is thereby opened and the system is rendered inoperative. Lamp 87, which was bright as long as transformer 37 was energized, then becomes dark, indicating that the system has been locked out. The system may then be returned to the operative condition by replacing film 26 with an unexposed film and resetting contact 86c to a position in engagement with contact 86d corresponding to the length of the film.

Although but one embodiment of the present invention has been illustrated and described, it will be apparent to one skilled in the art that various changes and modifications may be made therein without departing from the spirit of the invention or from the scope of the appended claims. Features disclosed but not claimed herein are claimed in an application of J. J. Borek and A. M. Zarem, Serial No. 640,958, filed January 12, 1946.

It is claimed and desired to secure by Letters Patent:

1. In an oscillograph comprising a system for producing a succession of traces responsive to a predetermined operating condition of an electric circuit, each of said traces having a substantial time of persistence, a camera having a shutter, and a film winding mechanism for said camera, the combination of control means responsive to an abnormal condition affecting the operation of said circuit for causing opening of said shutter, further means responsive to said abnormal condition for causing reclosure of said shutter, operation of said film winding mechanism and resetting of said control means, and means responsive to completion of a predetermined number of operations of said control means for rendering said control means inoperative when the supply of film of said camera is exhausted.

2. In an oscillograph comprising a system for producing a succession of traces responsive to a predetermined operating condition of an electric circuit, each of said traces having a substantial time of persistence, and a camera having a shutter, the combination of control means responsive to an abnormal condition affecting the operation of said circuit for causing opening of said shutter, means responsive to operation of said control means for causing reclosure of said shutter and resetting of said control means, and means responsive to completion of a predetermined number of operations of said control means for rendering said control means inoperative when the supply of film of said camera is exhausted.

3. In an oscillograph comprising a system for producing a succession of traces responsive to a predetermined operating condition of an electric circuit, each of said traces having a substantial time of persistence, a camera having a shutter, and a film winding mechanism for said camera, the combination of control means responsive to an abnormal condition affecting the operation of said circuit for causing opening of said shutter, means responsive to operation of said control means for causing momentary interruption of the operation of said trace producing means, reclosure of said shutter, operation of said film winding mechanism, and resetting of said control means, and means responsive to completion of a predetermined number of operations of said control means for rendering said control means inoperative when the supply of film of said camera is exhausted.

4. In an oscillograph comprising a system for producing a succession of traces responsive to a predetermined operating condition of an electric circuit, each of said traces having a substantial time of persistence, a camera having a shutter, and a film winding mechanism for said camera, the combination of control means responsive to an abnormal condition affecting the operation of said circuit for causing opening of said shutter, means responsive to operation of said control means for causing momentary interruption of the operation of said trace producing means, reclosure of said shutter, operation of said film winding mechanism, and resetting of said control means, and means responsive to completion of a predetermined number of operations of said film winding mechanism for rendering said control means inoperative when the supply of film of said camera is exhausted.

5. In an oscillograph comprising a system for producing a succession of traces responsive to a predetermined operating condition of an electric circuit, each of said traces having a substantial time of persistence, a time indicating device, and a camera pointed at said traces and at said time indicating device and having a shutter, the combination of control means responsive to an abnormal condition affecting the operation of said circuit for causing opening of said shutter, and further means responsive to said abnormal condition for momentarily illuminating said time indicating device, reclosing said shutter, and resetting said control means.

6. In an oscillograph comprising a system for producing a succession of traces responsive to a predetermined operating condition of an electric circuit, each of said traces having a substantial time of persistence, a time indicating device, and a camera pointed at said traces and at said time indicating device and having a shutter, the combination of control means responsive to an abnormal condition affecting the operation of said circuits for causing opening of said shutter, and means responsive to operation of said control means for momentarily illuminating said time indicating device, reclosing said shutter, and resetting said control means.

ABE M. ZAREM.
RAYMOND D. WEINHOLD.

REFERENCES CITED

The following references are of record in the file of this patent:

UNITED STATES PATENTS

| Number | Name | Date |
|---|---|---|
| 2,160,006 | Thompson et al. | May 30, 1939 |
| 2,186,268 | Pakala | Jan. 9, 1940 |
| 2,264,615 | Bryce | Dec. 2, 1941 |